US012608583B2

(12) United States Patent
Tormasov et al.

(10) Patent No.: US 12,608,583 B2
(45) Date of Patent: Apr. 21, 2026

(54) SYSTEM AND METHOD FOR GENERATING A USER BEHAVIORAL AVATAR FOR A SOCIAL MEDIA PLATFORM

(71) Applicant: Acronis International GmbH, Schaffhausen (CH)

(72) Inventors: Alexander Tormasov, Moscow (RU); Stanislav Protasov, Singapore (SG); Serg Bell, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 902 days.

(21) Appl. No.: 17/872,076

(22) Filed: Jul. 25, 2022

(65) Prior Publication Data

US 2022/0358344 A1      Nov. 10, 2022

Related U.S. Application Data

(63) Continuation-in-part of application No. 15/469,647, filed on Mar. 27, 2017, now abandoned.

(60) Provisional application No. 62/316,633, filed on Apr. 1, 2016.

(51) Int. Cl.
| | |
|---|---|
| *G06N 3/006* | (2023.01) |
| *G06Q 50/00* | (2012.01) |
| *H04L 67/306* | (2022.01) |
| *H04L 67/50* | (2022.01) |

(52) U.S. Cl.
CPC ............. *G06N 3/006* (2013.01); *G06Q 50/01* (2013.01); *H04L 67/306* (2013.01); *H04L 67/535* (2022.05)

(58) Field of Classification Search
CPC ..... G06N 3/006; H04L 67/535; H04L 67/306; G06Q 50/01
See application file for complete search history.

(56) References Cited

U.S. PATENT DOCUMENTS

| | | | | |
|---|---|---|---|---|
| 2005/0171997 | A1* | 8/2005 | Seo ................... | H04M 1/72406 |
| | | | | 709/202 |
| 2008/0235581 | A1* | 9/2008 | Caporale ............... | G06N 20/00 |
| | | | | 715/706 |
| 2012/0303559 | A1* | 11/2012 | Dolan .................... | G06N 20/00 |
| | | | | 706/12 |
| 2016/0086500 | A1* | 3/2016 | Kaleal, III ............... | A61B 5/20 |
| | | | | 434/257 |

* cited by examiner

*Primary Examiner* — Sherrod L Keaton
(74) *Attorney, Agent, or Firm* — ArentFox Schiff LLP; Michael Fainberg

(57) ABSTRACT

Systems and methods are disclosed for generating a user behavioral avatar. A method may include receiving a request to generate an avatar that performs actions on behalf of a user on a social media platform; identifying a plurality of historical user actions manually taken by the user on the social media platform; generating, based on the plurality of historical user actions, an action profile that represents user tendencies for executing available actions on the social media platform; identifying a plurality of data items in a retrieved backup of at least one computing device associated with the user; classifying the plurality of data items into a plurality of topics; training and executing the avatar to detect, in the social media platform, a social media item that shares at least one topic of the plurality of topics from the backup and perform a user action in accordance with the action profile.

18 Claims, 8 Drawing Sheets

200

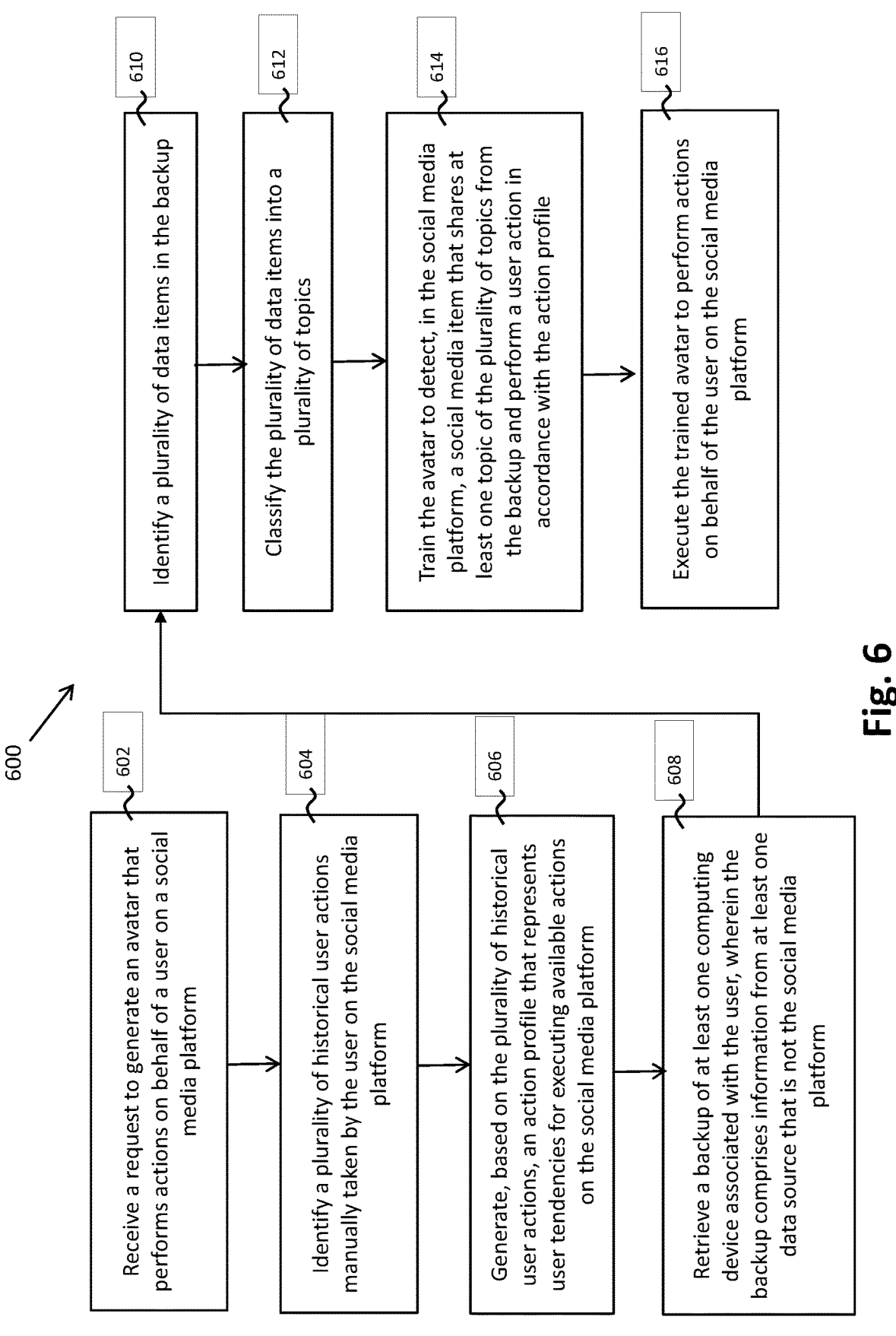

600

610 Identify a plurality of data items in the backup

612 Classify the plurality of data items into a plurality of topics

614 Train the avatar to detect, in the social media platform, a social media item that shares at least one topic of the plurality of topics from the backup and perform a user action in accordance with the action profile 616 Execute the trained avatar to perform actions on behalf of the user on the social media platform 602 Receive a request to generate an avatar that performs actions on behalf of a user on a social media platform 604 Identify a plurality of historical user actions manually taken by the user on the social media platform 606 Generate, based on the plurality of historical user actions, an action profile that represents user tendencies for executing available actions on the social media platform 608 Retrieve a backup of at least one computing device associated with the user, wherein the backup comprises information from at least one data source that is not the social media platform

Fig. 6

SYSTEM AND METHOD FOR GENERATING A USER BEHAVIORAL AVATAR FOR A SOCIAL MEDIA PLATFORM

CROSS REFERENCE TO RELATED APPLICATIONS

The present application is a continuation-in-part of U.S. Non-Provisional application Ser. No. 15/469,647, filed on Mar. 27, 2017, which claims priority to U.S. Provisional Application No. 62/316,633, filed on Apr. 1, 2016, the entire contents of both which are hereby incorporated by reference.

TECHNICAL FIELD

The disclosure herein relates generally to social media, and more particularly, to a system and method of generating a user behavioral avatar.

BACKGROUND

As the popularity of computing devices and mobile computing devices (e.g., smartphones) increases and the applications for these devices continue to develop with diversified functions, more and more users are using these devices for the purposes of connecting to the Internet, taking pictures, listening to music, watching movies, sharing information, and the like. Although these computing devices improve the convenience of our life, the data stored in the devices becomes increasingly large, and there are significant issues such as the privacy of a user and the confidentiality of data. Moreover, users often need to complete tens, hundreds or even thousands of online actions (e.g., online payments, social media posts, and the like) each month.

When a user works with a computer or a mobile device and performs online actions, the user constantly modifies or creates different files and objects (e.g., some local, some remote, etc.) by writing messages, posting forum/blog entries, taking pictures, loading pictures from other sources, and the like. Further, the data related to these actions is not separately recorded for a backup for the particular user. Rather, a conventional backup utility only deals with modified files over a period of time on a particular computer system (or a mobile device) and writes them into the backup. The conventional backup utility is not concerned with any personal user data such as, for example, data reflecting who has created or modified or downloaded the files and how have these actions been performed. In other words, the conventional backup is focused on restoration of a previous state of the computer system (or a mobile device) as a whole rather than focusing on the personal user data.

Accordingly, a system and method is desired for backup and recovery of personalized data for a particular user. Moreover, a system and method is desired for using this personalized data to facilitate automatic action performed on behalf of the user to minimize required/expected online and other computer actions.

SUMMARY

Accordingly, the present disclosure is related to a system and method for backup and recovery of personalized user data that substantially obviates one or more of the disadvantages of the related art. Moreover, the present disclosure provides a system and method that creates a user behavioral avatar based on the actions related to the personalized user data.

In one aspect of the disclosure, a personalized data backup application logs all user actions performed with the user's electronic files. During operation, all files modified by user actions, such as sending messages, uploading images or videos, taking pictures/videos, posting on social networks or in the chats, activating voice or sensory devices, are detected. These files can be located on user's mobile device or computer system. Then, the user backups reflecting data modified by the user on different devices are used to identify user actions based on the modified user data. The user actions are then used to create and/or train a personal behavior avatar that can act as the user to perform some online or electronic action based on the user heuristic patterns used to generate and train the user behavioral avatar, which can be a software algorithm, for example.

According to another exemplary aspect, a method is provided for generating a user behavioral avatar for a user based on backup of personalized user data. In this aspect, the method includes storing, in electronic memory of at least one electronic device, a plurality of user data items; tracking, by at least one processor, user actions on the at least one electronic device and user actions on external resources communicatively coupled to the at least one electronic device to detect at least one modified user data item of the plurality of user data items that is modified directly or indirectly by the user actions on the at least one electronic device and on the external resources; converting, by the at least one processor, the at least one modified user data item to at least one corresponding identified user action, respectively; training, by the at least one processor, the user behavioral avatar based on the converted at least one corresponding identified user action; and automatically performing, by the trained user behavioral avatar, an automated user action on behalf of the user without requiring any input from the user via the at least one electronic device.

In another aspect, the method includes continuously tracking, by the at least one processor, the user actions on the at least one electronic device and the user actions on external resource; and storing, on a cloud computing service or a local storage, the plurality of user data items and continuously storing backup copies of the at least one modified user data item on the cloud computing service or the local storage each time the at least one modified user data item of the plurality of user data items is detected to have been modified directly or indirectly by the user actions.

In another aspect of the method, the plurality of user data items modified by the user action are at least one of data items directly affected by the user actions, data items indirectly affected by the user actions through user applications on the at least one electronic device, and data items affected by additional applications interacting with the user applications.

In another aspect of the method, the automated user action that is automatically performed by the trained user behavioral avatar comprises conducting activity on at least one of an online forum or blog, an online social network, an online multimedia services, an online data storage service, an online banking service, a voice activated device, a sensor activated device, and an online shopping service.

In another aspect of the method, the user actions are textual descriptions entered by the at least one electronic device and the training of the user behavioral avatar includes generating scripts for execution based on the textual descriptions.

In another aspect, the method includes continuously tracking the user actions on the at least one electronic device and the user actions on the external resources; and continuously training the user behavioral avatar based on the identified user actions that are based on the detected at least one modified user data item of the plurality of user data items.

In another aspect, the method includes training, by the at least one processor, the user behavioral avatar to automatically generate textual posts to be automatically posted on at least one of the external resources.

In another aspect, the method includes presenting the textual post to the user for approval and automatically posting, by the trained user behavioral avatar, the textual post on the at least one of the external resource upon receiving approval from the user.

In another aspect of the method, the tracking of the user actions on the at least one electronic device and the user actions on external resources comprises detecting a time and a procedure associated with the at least one modified user data item that is modified directly or indirectly by the user actions, and the training, by the at least one processor, of the user behavioral avatar is based at least partially on the time and the procedure of the user action that modified the at least one modified user data item.

In another aspect, a system is provided for generating a user behavioral avatar for a user based on backup of personalized user data. In this aspect, the system includes electronic memory of at least one electronic device configured to store a plurality of user data items; and at least one processor configured to track user actions on the at least one electronic device and user actions on external resources communicatively coupled to the at least one electronic device to detect at least one modified user data item of the plurality of user data items that is modified directly or indirectly by the user actions on the at least one electronic device and on the external resources, convert the at least one modified user data item to at least one corresponding identified user action, respectively, and train the user behavioral avatar based on the converted at least one corresponding identified user action, wherein the trained user behavioral avatar is configured to automatically perform an automated user action on behalf of the user without requiring any input from the user via the at least one electronic device.

In another aspect, a non-transitory computer readable medium storing computer executable instructions is provided for generating a user behavioral avatar for a user based on backup of personalized user data. In this aspect, instructions are provided for storing, in electronic memory of at least one electronic device, a plurality of user data items; tracking user actions on the at least one electronic device and user actions on external resources communicatively coupled to the at least one electronic device to detect at least one modified user data item of the plurality of user data items that is modified directly or indirectly by the user actions on the at least one electronic device and on the external resources; converting the at least one modified user data item to at least one corresponding identified user action, respectively; training the user behavioral avatar based on the converted at least one corresponding identified user action; and automatically performing, by the trained user behavioral avatar, an automated user action on behalf of the user without requiring any input from the user via the at least one electronic device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 illustrates a flow diagram of a method for generating a user behavioral avatar that handles social media user actions.

DETAILED DESCRIPTION

Figure 1:
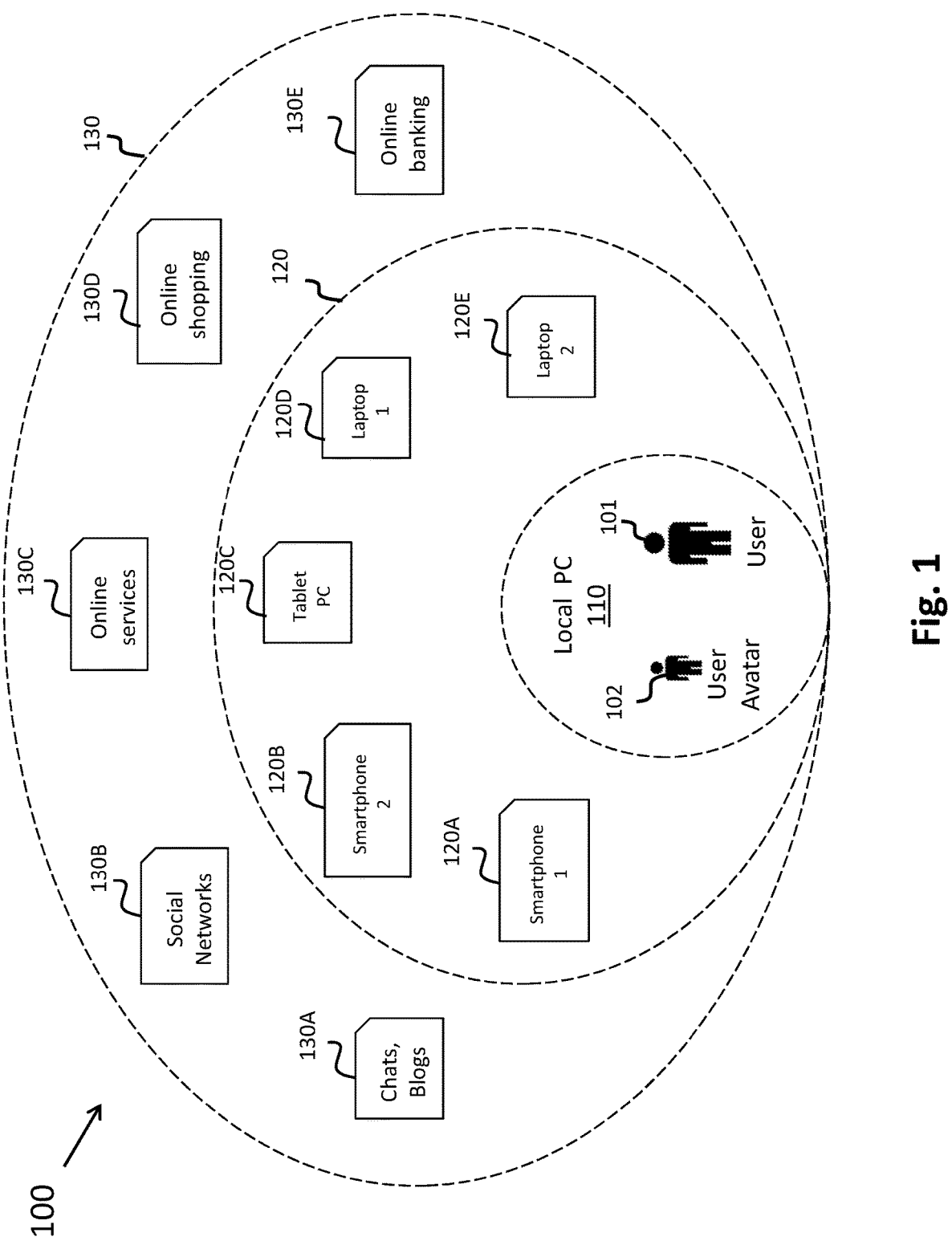
FIG. 1 illustrates a block diagram of a general infrastructure for backup and recovery of personalized user data and creation of a user behavioral avatar based on the backed-up user data.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In exemplary aspect, a personalized data backup application logs all user actions performed with the user's files on different user devices. Then, a user heuristic avatar is created based on user actions restored from user backups reflecting data modified by the user actions.

FIG. 1 illustrates a block diagram of a general infrastructure for backup and recovery of personalized user data and creation of a user behavioral avatar based on the backed-up user data according to an exemplary aspect. In general, the disclosed system utilizes a local personal computer ("PC") 110 of the user 101 that implements one or more personalized data backup applications that are configured to log some (preferably all) user actions performed with the user's electronic computer files. Then, the modified user files are backed-up for recovery and later used to train a personalized avatar 102 to perform automated user actions, as described in detail below.

According to the exemplary aspect, all (or most) the files modified by the user actions (e.g., sending messages, uploading images or videos, taking pictures/videos, posting on social networks or in chats, forums or blogs, and the like) are detected. In one aspect, these files can be located on the user's mobile device(s) or computer system(s), for example. Moreover, the files can be modified by user actions indirectly. As will be discussed in greater detail below, the detected modified files are written into storage fully or incrementally, which can be performed dynamically (i.e., after each user action) or periodically.

As further shown, the local PC 110 is provided to manage the data of a plurality of user devices, including the PC 110 itself, as well as a plurality of secondary devices (i.e., "personal" devices 120). For example, the user 101 can have a first smartphone 120A, a second smartphone 120B, a tablet PC 120C, a first laptop 120D and a second laptop 120E. Of course it should be appreciated that these five personal devices are shown in FIG. 1 only for illustrative purposes.

Moreover, it should be understood that the user 101 can use the local PC 110 and/or one or more of the secondary personal devices 120A-120E to contact and/or interact with third party services 130 (i.e., "external resources"), such as the Internet, websites, and the like. Thus, according to an exemplary aspect, user activity in blogs 130A and social networks 130B is detected in order to determine which user files on the various devices have been modified. Moreover, the system can monitor activity on certain online services 130C, including online shopping 130D and/or online banking 130E, as well as other services such an online gaming systems (e.g., Pokemon Go™).

In these aspects, user actions, for example, on sites of social network 130B can be intercepted and the associated data (e.g., messages, discussion threads, images, videos etc.) can be stored and copied into a backup, as will be discussed in detail below. In one aspect, all user modifications can be detected by crawlers or search bots that can detect all modifications made by a user in a certain volume or directory, for example. All these files are checked for their uniqueness and added to the backup when changes have been detected. If several modifications have been done by the user, the entire history of the file(s) is stored, according to one aspect. Moreover, in a further refinement of the aspect, the system is configured to store only user-modified data as opposed to storing all data of a web page accessed by the user (i.e., for example, together with some website identifying data).

It should be appreciated that certain user data can be affected by user actions indirectly. For example, if a user posts some comment to an already existing post or several posts, the system can identify the original (i.e., initial post and possibly some other parts) and the initial post can be included into a backup for clarity and recovery efficiency, for example. Moreover, according to one aspect, all application files on the computer system (e.g., local PC 110) or mobile device (e.g., smartphone 120B) affected by user interaction with the computer or device are detected and stored into the backup. Additionally, any user modifications to the configuration files that occur during the user session are recorded. In one aspect, some (and preferably all) of these files are identified (i.e., detected) by the detection algorithm, including using heuristic and other detection rules.

Moreover, as will be described in more detail below, the detected modified files can be written into a backup on a storage, such as a cloud storage service. Then, the user backups reflecting data modified by the user on different devices are used to restore user actions, which, more specifically can be restored into a personal user "behavior avatar" 102. In this aspect, the avatar 102 (i.e., a software algorithm) on local PC 110 can act as a user himself/herself based on the user heuristic patterns restored into the avatar 102. In other words, the avatar 10 can be "trained" or "taught" to behave like the user. For example, the user avatar 102 can make automatic responses in the different social networks as would be done by the actual user 101, send auto responses/follow-ups, even edit documents like the user or perform any actions that are "virtually controlled" from the user devices, for example. In a refinement of this aspect, the avatar 102 can also be trained within the cloud computing service. That is, instead of the avatar being generated and trained on the local PC 110, the modified data can be backed up on the cloud computing service, which includes a processor configured to train the avatar 102.

Figure 2:
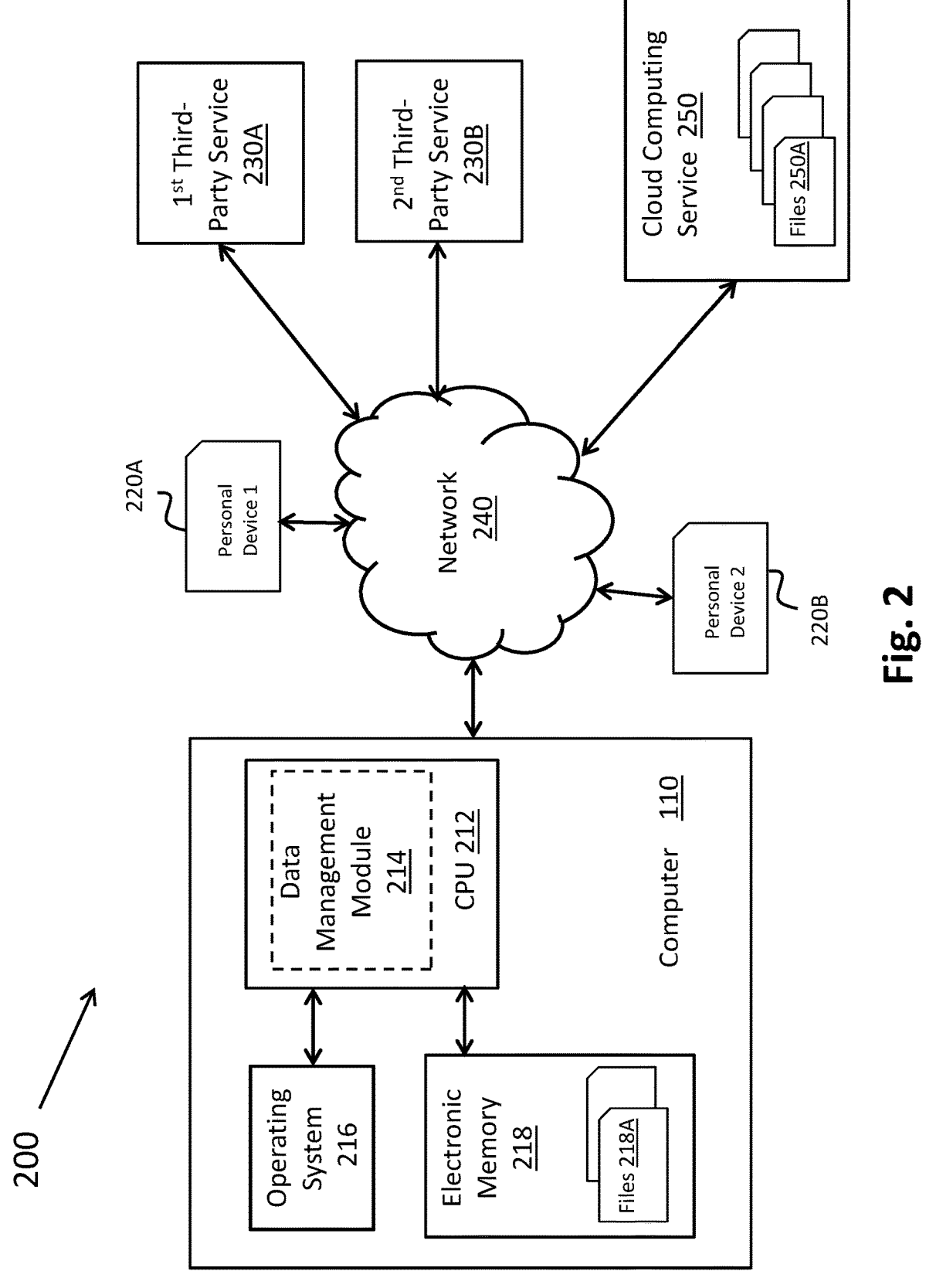
FIG. 2 illustrates a block diagram of a system for backup and recovery of personalized user data and creation of a user behavioral avatar based on the backed-up user data.

FIG. 2 illustrates a block diagram of a system for backup and recovery of personalized user data and creation of a user behavioral avatar based on the backed-up user data according to an exemplary aspect. As shown, the system 200 generally includes a computer 110, which can correspond to the local PC 110 shown in FIG. 1 and discussed above. The details of the computer 110 will be discussed below with respect to FIG. 3, but generally the computer 110 is configured to detect user actions and manage the storage of related user data and generate a personalized avatar 102 for the user 101, as described herein. Moreover, according to the exemplary aspect, the computer 110 may be any type of computing device, such as a laptop, a desktop, a tablet, a mobile phone and the like. The specific hardware details of the exemplary computer 110 will be described below with respect to FIG. 5.

As further shown, the system 200 includes a plurality of personal devices 220A and 220B (e.g., user gadgets and the like). The personal devices 220A and 220B corresponds to one or more of the secondary personal devices 120A-120E shown in FIG. 1 and discussed above. Moreover, the computer 110 is configured to detect and identify each of the plurality of personal devices 220A and 220B using known public accounts of the user, such as Google®, Microsoft®, Apple® ID, and the like.

Furthermore, in the exemplary aspect, the personal devices 220A and 220B are configured to communicate with the computer 110 over a network 240 using conventional communication techniques and protocols. The applicable network 240 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

In addition, a plurality of third-party services (i.e., first and second third-party services 230A and 230B) are also communicatively coupled to the system 200 by network 240. According to the exemplary aspect, the third-party services 230A and 230B correspond to one or more of blogs 130A (i.e., forums, chat rooms and blog); social networks 130B (e.g., Facebook®, Twitter®, Instagram®, LinkedIn®, and the like); online services 130C, including online multimedia services (e.g., YouTube®, Flickr®, and the like) and online data storages (e.g., Dropbox®, OneDrive®, Google Drive®, and the like); online shopping 130D; and/or online banking 130E. According to the exemplary aspect, the computer 110 is further configured to detect user activities across global networks relating to one of the third-party services 230A and 230B, as will be discussed in detail below. In yet a refinement of this aspect, the computer 100 can further detect user activities by monitoring MMS/SMS messages, for example.

Referring back to the computer 110, the computer 110 includes an operating system 216 and a central processing unit ("CPU") 212 provided to, among other things, execute data management module 214. In this aspect, the data management module 214 includes software code (e.g., processor executable instructions) in memory, which may be configured to execute/facilitate the storing and managing of user data according to the exemplary aspects described herein.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the computer 110 and/or CPU 212 and/or one of the specific modules as shown to perform the various steps of the algorithm.

As further shown in FIG. 2, the computer 110 includes electronic memory 218 that stores electronic data, for example, data files 218A, which can be one or several types of personal data, such as user data including files, documents, pictures, videos, and the like. Moreover, according to an exemplary aspect, the electronic memory 218 can be a computer-readable medium includes data storage, and, by way of example, and not limitation, can comprise RAM, ROM, EEPROM, CD-ROM, Flash memory or other types of electric, magnetic, or optical storage medium, or any other medium.

According to the exemplary aspect, the data management module 214 is configured to detect and identify all information relating to a user of the computer 110 and then back up all modified user-related data to a remote data storage device, such as cloud computing service 250, which can include a data archive (i.e., cloud storage), for example.

It is contemplated that the cloud computing service 250 can include any type of remote file storage system, such as an online/remote file storage service or cloud computing service. Examples of such services include Amazon® Simple Storage Service ("S3"), and Microsoft® Azure ("Azure"). In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

According to the exemplary aspect, computer 110 is configured to transmit to and store personal data on the data archive of the cloud computing service 250 via network 240. It should be appreciated that while cloud computing service 250 is described as an online/remote file storage service (e.g., a cloud computing service) according to an exemplary aspect, the data archive can be incorporated into a local area network or the like, directly coupled to computer 110, as should be appreciated to those skilled in the art.

Once the computer 110, and, more particularly, the data management module 214 identifies the user activities, the user files (e.g., files 218A stored in memory 218) modified by these activities directly or indirectly are identified and transmitted to cloud computing service 250 for backup and processing. Moreover, the data management module 214 is also preferably configured to detect the file(s) directly affected by the user interactions with the particular device, such as a PC, laptop, tablet or smartphone (i.e., the personal devices 220A and/or 220B). It should be appreciated that while the exemplary aspect is described with regard to detected changes in user files 218A on computer 110 in response to certain detected user activities, that the modified files could be stored on one or more of the secondary personal devices (e.g., the personal devices 220A and/or 220B) according to an alternative aspect or in combination with the exemplary aspect. Moreover, in addition to the modified user data that is backed-up by the cloud computing service 250, the system can further be configured to store metadata relating to the user actions that resulted in the modified user files, including the time of the action, the type of the action, who performed the action, and the like. Thus, in this aspect, the metadata relating to user actions as to how the file was modified is stored together with the modified file. As further described above, the computer includes the CPU 110 that is configured to execute data management module 214 that is configured to perform the algorithms described below.

Figure 3:
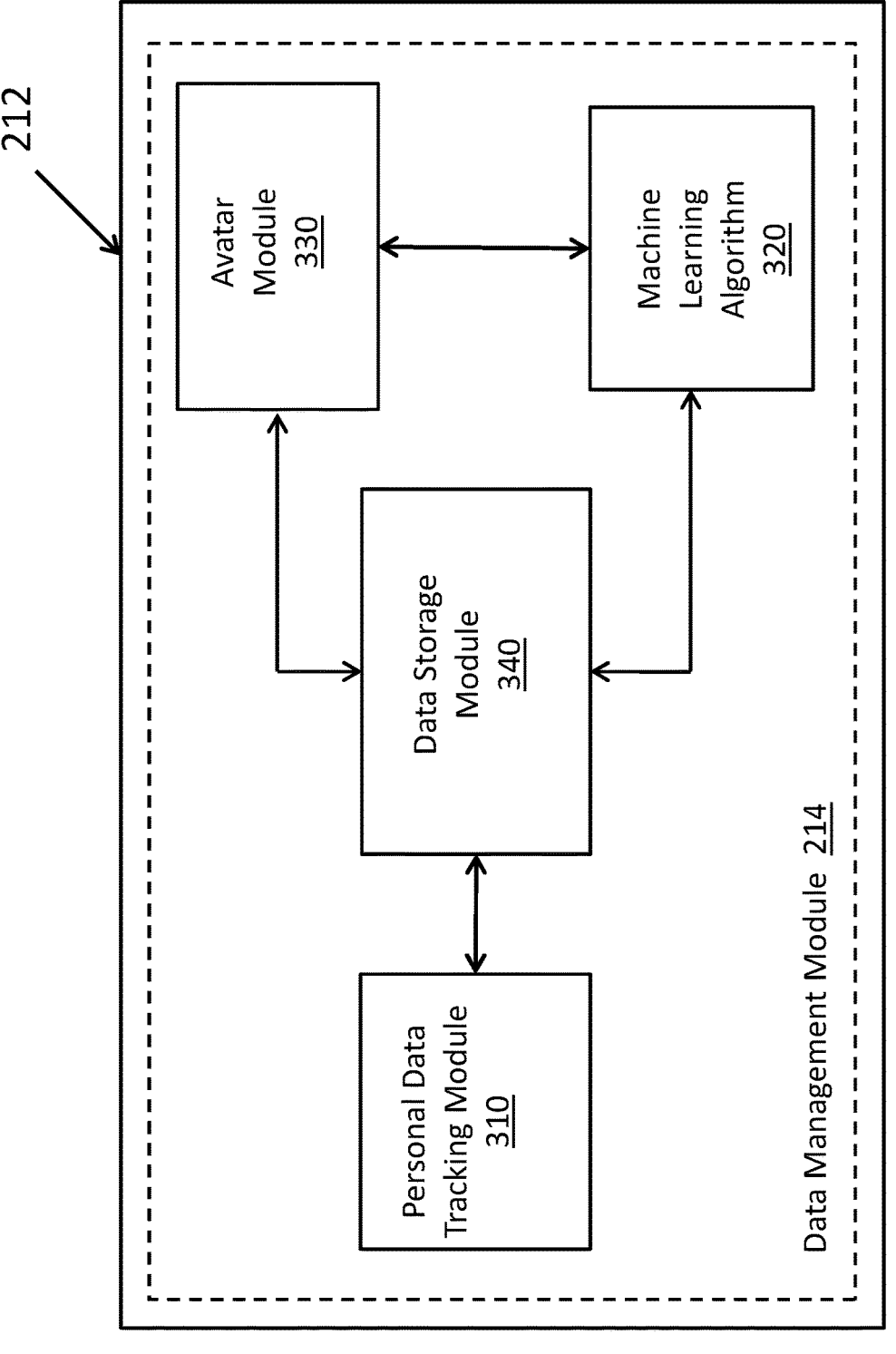
FIG. 3 illustrates a block diagram of a data management module for backup and recovery of personalized user data and creation of a user behavioral avatar based on the backed-up user data.

As shown in FIG. 3, the data management module 214 can be composed of a plurality of modules. For example, the data management module 214 can include personal data tracking module 310, a machine learning algorithm 320, an avatar module 330 and data storage module 340. For purposes of the disclosure below with respect to the exemplary algorithms, the disclosure generally refers to the computer 110, the data management module 214 and/or one or more of the sub-modules shown in FIG. 3 as performing the various steps, but it should be appreciated that the applicable modules shown are provided to perform such steps according to an exemplary aspect. Moreover, in an alternative aspect, the machine learning algorithm 320 and avatar module 330 can be software modules executed by the cloud computing service 250, for example, to generate and train the personalized avatar 102.

Specific exemplary aspects of each sub-module 310-340 will be described in more detail below with respect to the disclosed algorithms. However, generally the personal data tracking module 310 is configured to monitor the personal computer 110 and/or secondary personal devices (e.g., device 220A and/or 220B) to detect interactions with external resources, such as services 130A-130E described above with respect to FIG. 1. For example, these interactions may be a user's action using a smartphone to post a picture on a social media website and respond to a post. In this example, the personal data tracking module 310 is further configured to identify, which, if any personal user data (e.g., files) stored on the computer 110 (e.g., files 218A) and/or one or more secondary personal devices were modified as a result of this interaction/user action. Moreover, data storage module 340 is configured to communicate with the cloud computing service 250 by sending modified user files to the remote data storage to be stored as backed-up files.

Yet further, machine learning algorithm 320 and avatar module 330 are configured to work together to track the user actions/responses to generate and build the user behavioral avatar 102. For example, as described generally above, all user responses in different situations are continuously collected by personal data tracking module 310 and used to generate and train the avatar 102 according to the collected user behavior data. In this aspect, the avatar 102 can be configured to perform the same or very similar actions to those of the actual user 101 at the usual time when the user 101 usually performs such actions. For example, if the user 101 logs into a certain blog, reads news and writes a comment once a week (e.g., on Mondays), the avatar 102 can be trained to perform actions on behalf of the user 101. Thus, in an exemplary aspect, the avatar training can be based on deep learning neural networks with machine learning algorithms, for example, and standard approach to their training. In another exemplary aspect, the avatar training can use "chatbot" (also known as a talkbot, chatterbot, Bot, chatterbox, Artificial Conversational Entity), which are computer programs configured to conduct a conversation via auditory or textual methods. For example, an exemplary chatbot is "Goostman chatbot" (see, e.g., https://www.chatbots.org/chatterbot/eugene_goostman/ and similar such chatbots).

In another aspect, the avatar 102 can prepare user actions and provides them to the user for confirmation. For example, the avatar 102 can include software scripts to automatically log into a blog, open a comment window and write a comment. A text file of the proposed comment can then be presented on a display device of the PC 110. If the user 101 confirms the comments by selecting an approval input, for example, the avatar 102 can automatically post the comment on the respective blog. Thus, the avatar 102 will effectively ask the user 101 to confirm this comment prior to posting it to the blog.

In an exemplary aspect, the user comments on the block can be analyzed by the machine learning algorithm 320 in order to train the avatar 102 to generate similar texts. In this aspect, the machine learning algorithm 320 can analyze the user texts using key words or semantic analysis. Then, the avatar module 330 (which can be considered and/or control the acting avatar 102) can post comments to other posts in the blog based on the previously analyzed responses of the user 101. If the user 101 has his blog, the avatar 102 can respond to comments or questions on behalf of the user 101. Thus, the avatar 102 is configured to analyze the texts (from other users, for example) and generate answers or provide data requested in the comments (e.g., sale related data or prices). In another aspect, the avatar 102 can be configured to set service appointments where a user requests an appointment and the avatar 102 checks the schedule (e.g., stored in an electronic calendar of the PC 110) and responds with the appointment time.

It should be appreciated that the actions of the user 101 can be, for example, routine actions, such as paying bills on-line by entering account data for making payments for regular utilities (e.g., water, electricity, Internet, TV cable, and the like). In this regard, the personal data tracking module 310 is configured to track the user 101 interaction with specific websites for paying these bills (including recording user name, password, scheduled payment, etc.) and store this data using data storage module 340. Once more user actions-related data is detected and saved into a backup (e.g., by cloud computing service 250), the corresponding user actions can be accessed by machine learning algorithm 320 (via data storage module 340, for example) and restored into the avatar 102 by avatar module 33. Thus, the personalized behavior-based avatar 102 is trained, taught or otherwise adapted as the user 101 performs more actions with files on his/her devices and these files are stored in the user personalized backup. Thus, in this aspect, the avatar 102 can be taught by the machine learning algorithm 320 or a deep learning algorithm, by using local user actions and user posts on social networks. As a result, the avatar 102 can be configured to generate user responses to posts or comments based on the history of the user's 101 previous responses to the similar comments. For example, if the avatar 102 detects a discussion about "Washington Capitals" hockey team, the avatar 102 can be configured to add a comment based on the fact that the user is a fan of this team based on his posting history.

Moreover, according to the exemplary aspect, the user actions can be represented by textual descriptions such as add/delete texts. In this aspect, the user actions included into the avatar 102 can also be represented as scripts generated based on the previous user actions. For example, the avatar 102 can have a set of user answers (or comments) templates trained by machine learning algorithm 320 that can be easily edited for a given situation. In the exemplary aspect, the avatar 102 is based on an algorithm (i.e., avatar module 33), which executes certain scripts at certain time based on user action-related data used for the executable instructions. As such, in this aspect, the avatar 102 uses a set of user-related data and an algorithm. The data can be stored in the cloud 250 and the algorithm can be executed by personal computer 110 or even inside a virtual environment (e.g., a VM or Container) located on the cloud 250 as well. It should be appreciated that strong data encryption (e.g., based on biometric data) is generally used in order to protect user data on the cloud.

Moreover, according to the exemplary aspect, large volumes of data from the user personal backups are preferably used for creation and "teaching" of the behavior of the avatar 102. In addition to the actual backup data, the data dynamics are used for restoring the corresponding user actions. The user can add a new area of interest (i.e., a new subject) to the avatar 102, and the avatar 102 will suggest to the user to comment on this subject. The data dynamics are analyzed by an analyzer component running on the user device (or the cloud computing service 250), such as personal data tracking module 310 and the machine learning algorithm 320, for example. The data dynamics mean that the order of data and related user actions is used in the analysis, and, therefore, reflect the style of user answers and social network activities based on topics or subjects, and the like. Moreover, the data dynamics can also reflect a level of user knowledge in the particular area. The data analyzing component can be configured to convert the modified user data from the personalized user backup into corresponding user actions. These data dynamics can be, for example, time when data was modified (or entered) and the procedure preceding the user data modification. The user behavior patterns are corrected on-the-fly (as the personalized backup is updated) and reflected in the user personalized behavioral avatar 102.

According to an exemplary aspect, user activity in social networks (e.g. 130B) and blogs (e.g., 130A) is detected in order to determine which files are modified. For example, actions by user 101 on social network sites can be intercepted and the associated data (e.g., messages, discussion threads, images, videos, etc.) can be stored by data storage module 340 and copied into a backup in the cloud computing service 250, for example. Subsequently, all corresponding user actions are interpreted by machine learning algorithm 320 and restored into user personalized behavior avatar 102 by avatar module 330. As a result, because the avatar 102 is trained, these actions can be performed by the avatar 102 on the user device(s) in similar situations. In this aspect, the user message and discussion threads are used as initial data for a the machine learning algorithm 320 and can be separated into groups based on subject matter (e.g., "Washington Capitals", "Sports", "hockey", etc.).

As further described above, in one aspect, all user modifications can be detected by crawlers or search bots that can detect all modifications made by a user in a certain volume or directory. All these files can be checked by personal data tracking module 310 for their uniqueness (to ensure there is no overlap) and then added to the backup by data storage module 340. Subsequently, the corresponding user actions are added to train the user avatar 102. If several modifications of the data have been done by the user 101, the entire history of the file(s) can be stored and reflected in the user avatar 102, for example. Moreover, in one aspect, only user-modified data is stored as opposed to storing all data of a web page accessed by the user (i.e., for example, together with some website identifying data).

In a refinement of the exemplary aspect, some or all application files on the computer system 110 or mobile device (e.g., smartphones 120A and 120B) affected by user interaction with the computer or device are detected and stored into the backup. Additionally, any user modifications to the configuration files that occur during the user session are recorded data storage module 340, using heuristic and other detection rules, for example. The heuristic data can be a time of user login into the device, for example. Moreover, user applications files (or database records) can be used as the heuristic data as well, where these files can be created by user 101 directly (e.g., Word files) or indirectly (e.g., auto-generated game applications files or configuration files). In the exemplary aspect, heuristic analysis of the user actions and data can include classifying user application files in three groups: first level—files created or modified by a user (e.g., email editors or web browser); second level—files created indirectly by applications as results of user actions (e.g., audit logs and metadata, etc.); and third level— application files, affected by a second level applications not directly affected by user actions but created as a result of user actions. It should be appreciated that some or all levels of heuristic data can be used for avatar module 330.

Figure 4A:
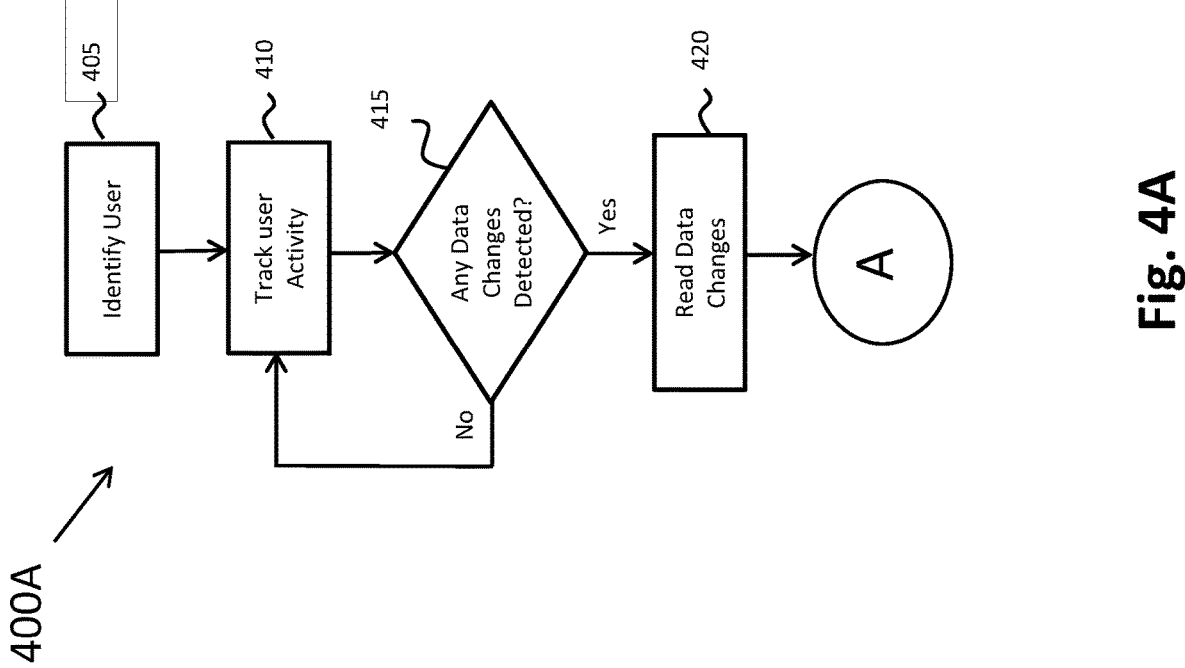
FIGS. 4A and 4B illustrate a flowchart for a method for backup and recovery of personalized user data and creation of a user behavioral avatar based on the backed-up user data.
Figure 4B:
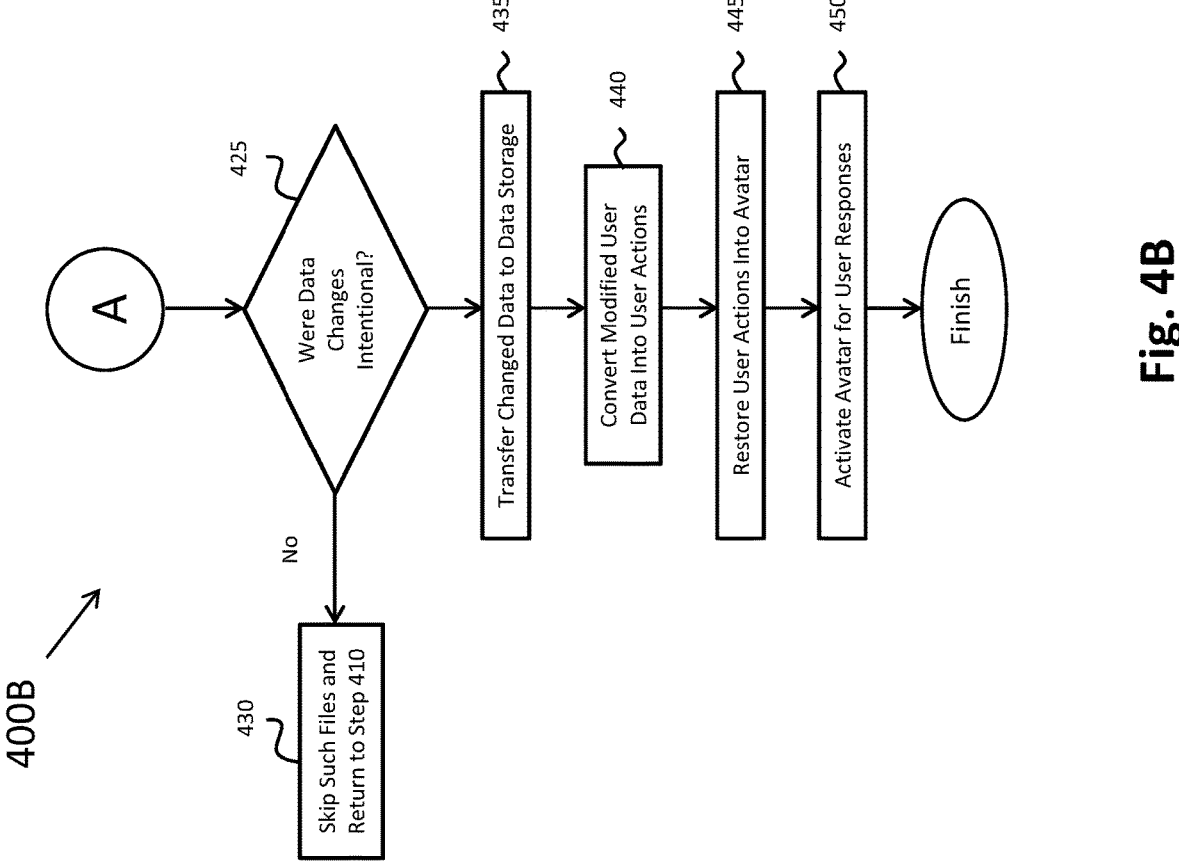

FIGS. 4A and 4B illustrate a flowchart for a method for backup and recovery of personalized user data and creation of a user behavioral avatar based on the backed-up user data according to an exemplary aspect. First, as shown in FIG.

4A, the computer 110 identifies the user 101 at step 405 of one or more personal devices (e.g., device 220A and/or 220B) and the personal devices interaction with a third-party service (e.g., a social network 130B). In particular, the one or more secondary personal devices can be linked (e.g., defined by a user) using personal data tracking module 310 to the computer 110. Thus, when one more of these secondary devices (e.g., 120A-120E) begins interacting with one or more Internet/third-party services (e.g., services 130A-130E), the personal data tracking module 310 is configured to identify certain user identification data to confirm that the user identified at step 405 is the actual user of computer 110 (and/or second devices) and, more particularly, the user of files 218A stored in electronic memory 218 of computer 110.

For example, the personal data tracking module 310 is configured to identify at least one of: (1) user credentials (e.g., logins/passwords) for the web accounts, services, etc.; (2) official personal identifications (e.g., registered accounts for any official, federal, government, municipal service, and the like); and/or any confirmed public accounts (e.g., OpenID or social network accounts, such as Facebook®, LinkedIn®, or the like). The personal data tracking module 310 can then compare the user identification information with valid/existing user identification information stored in electronic memory 218, for example, to confirm the identity of the user.

Next, at step 410, the personal data tracking module 310 begins tracking the user activity on one or more of these third-party services. For example, if the user is interacting on a social network 130B (e.g., Facebook), the personal data tracking module 310 can intercept user actions and the associated data (e.g., messages, discussion threads, images, videos etc.) using crawlers or search bots that can detect all modifications made by a user in a certain volume or directory, for example. Based on detected user activities, the personal data tracking module 310 is further configured to detect any actual changes in user data (e.g., files 218A) at step 415. If no actual changes in the user data have been detected, the method returns to step 410. Alternatively, if changes have been detected, the personal data tracking module 310 further reads or analyses these changes at step 420. Moreover, it is noted that while step 410 of tracking user activity is shown as occurring after the user is identified at step 405, in an alternative aspect, the user activity can first be tracked (e.g., by tracking a specific device's action), and if any actions are detected, the disclosed algorithm can then verify user identity.

In any event, as further shown in FIG. 4B, the personal data tracking module 310 determines whether the data changes were intentional at step 425. In other words, the personal data tracking module 310 is configured to determine if the data files on the user device were changed intentionally in that the user has changed configurations or downloaded some files, for example. In one aspect, the system can classify the applications with which user usually works (e.g., word processing applications, image processing applications, creating and modifying files, and the like) and set up policies or rules that execution of operations in these applications are indicative that the files (e.g., documents, pictures and the like) are modified intentionally. Alternatively, the system can also establish policies that indicate that any system action can be considered as unintentional, for example changes to configuration files, logs or the like. If the files were not intentionally changed (e.g., files loaded into a "temp" directory), these files are ignored at step 430 and the method returns to step 410 where the tracking continues. Thus, the system can include or exclude such data (or metadata) depending on the established our policy.

Alternatively, if the personal data tracking module 310 determines that the user files were changed intentionally (e.g., in response to a user action using one of the third-party services), the method proceeds to step 435, where the data storage module 340 transmits the modified user files to the cloud computing service 250 for storage therein as described above. More particularly, the data changes are recorded on cloud storage 250 at step 435. At step 440, the modified user data can be converted into user actions by machine learning algorithm 320, which is configured to interpret the user actions and profile the user as described above. The data analysis can be performed by the PC 110 or alternatively by a cloud computing service 250, for example.

Finally, at step 450, the avatar 102 is activated to perform certain identified actions, as described above. For example, in one aspect, the avatar module 330 may be configured to generate a user interface on PC 110 or one of the other user devices that enables the user to select certain online activities for which the avatar 102 is provided to act on the user's behalf. It should be appreciated based on the disclosure herein that the method can be continuously performed to continue to train and build the avatar 102 using the machine learning algorithm 320.

Additionally, the data management module 214 can use interfaces to the external applications, and particularly to services, such as Facebook, Twitter, Tumblr, Flickr, Instagram, and the like. In this aspect, the personal data tracking module 310 can track the activity of the user by tracking the fact that the user has activated the relevant applications that interface to the third-party services, such as social networks, Instagram type applications, Twitter, and the like, and track the activity by the user in that manner. Additionally, the personal data tracking module 310 can track the history of a user's visits to specific URLs, particularly where the URLs are indicative of specific activities, such as forums, blogs, online shopping, and so on. The personal data tracking module 310 can also track both the users of posts and responses/comments to them. As such, this information can be recorded and subsequently used to train the personalized behavioral avatar 102, as described above.

Figure 5:
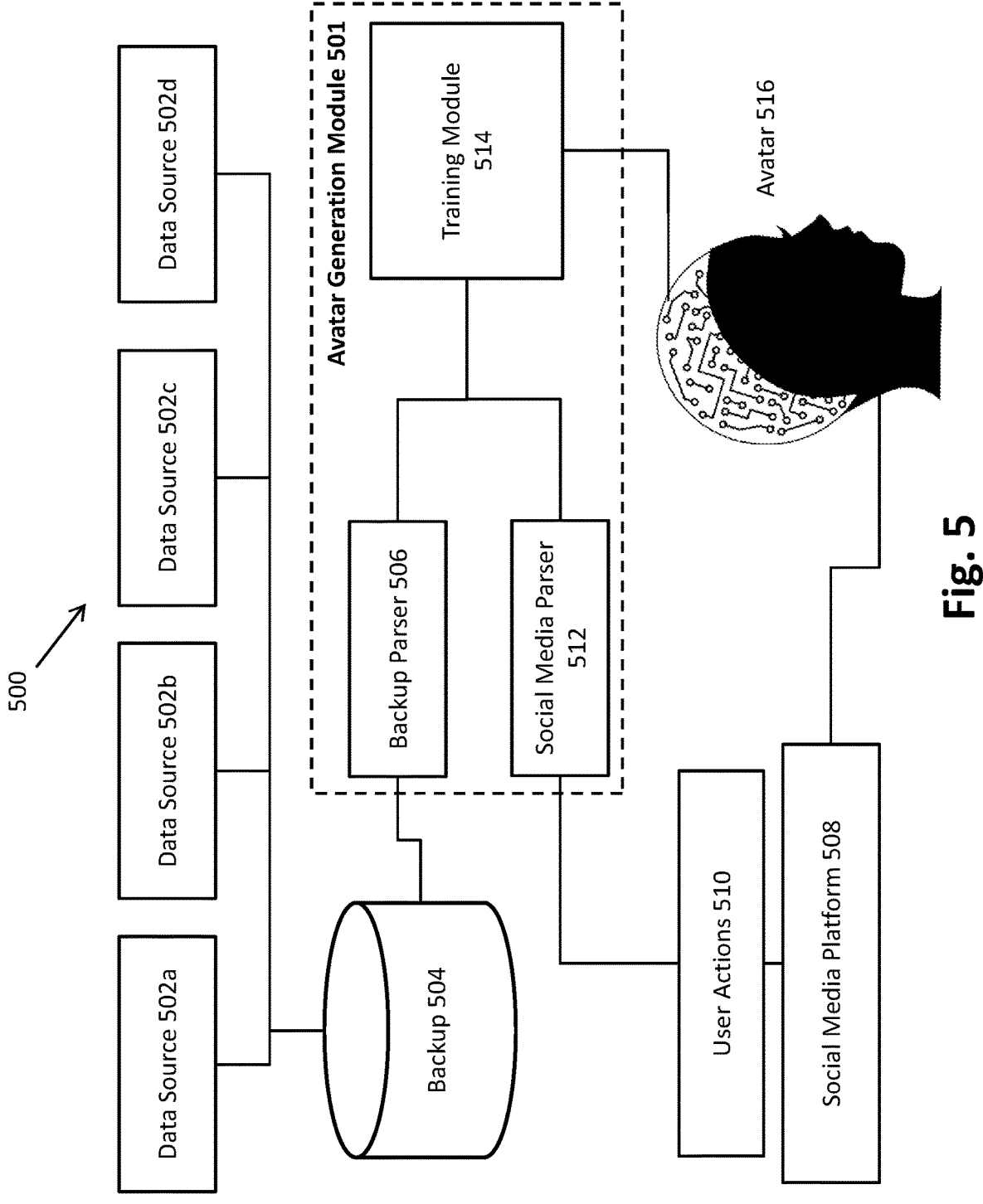
FIG. 5 illustrates a block diagram of a system for generating a user behavioral avatar that handles social media user actions.

FIG. 5 illustrates a block diagram of system 500 for generating a user behavioral avatar that handles social media user actions. System 500 includes data source 502a, data source 502b, data source 502c, and data source 502d. Examples of data sources include, but are not limited to, an email database, an application database, a documents database, or a media database. In some aspects, a data source may refer to a specific volume. For example, a first data source may be associated with the storage of a first computing device and another data source may be associated with the storage of a second computing device. In some aspects, a data source may be an external resource or third-party service such as chats 130a, online services 130c, online shopping 130d, and online banking 130e. Information from the data sources may be periodically backed up into backup 504, which may include a plurality of data items from the different data sources. For example, backup 504 may include a collection of emails, documents, applications, metadata detailing interactions with websites (e.g., webpage history), etc. In some aspects, personal data tracking module 310 and data storage module 340 populate backup 504 using the methods described previously.

Avatar generation module 501 is configured to generate avatar 516. Avatar generation module 501 includes backup parser 506, social media parser 512, and training module

514. In an exemplary aspect, avatar generation module 501 receives a request to generate an avatar that performs actions on behalf of a user on social media platform 508. There may be different motivations for a user to generate an avatar. For example, some users do not like using social media, but still wish to have a presence on social media (e.g., celebrities, politicians, sports players, etc.). In another example, as social media concepts such as the metaverse become more prominent, there may be a double perspective in everyday life for a user (e.g., a physical life and a virtual life). Due to the continuous interactions required in a metaverse, there may be no "off" time for a user. In other words, a user may choose not to access the metaverse during a certain time period, but a different user may be accessing the metaverse during that time period in order to communicate with the user. In the user's absence, avatar 516 can take over. Accordingly, when social media platform 508 is a metaverse-based application, and a trained avatar 516 may perform actions on behalf of the user when the user is not manually accessing the metaverse-based application.

In some aspects, avatar generation module 501 may be a part of social media platform 508 and can be accessed using a social media application. Suppose that social media platform 508 is an image sharing platform where users can share images and videos on a personalized feed that is accessible to social media connections made by the user (e.g., Instagram). The application that enables the sharing of images may include an option to request the generation of an avatar. In some aspects, the avatar may also have a visual appearance that can be customized by the user on the social media application. In terms of the decision-making prowess of the avatar, avatar generation module 501 trains the avatar to behave as the user would when accessing social media platform 508.

There are two main parts to the decision-making of avatar 516. The first is knowing how to perform a user action on social media platform 508 and the second is knowing when to perform the user action. The former is achieved by social media parser 512, which identifies a plurality of historical user actions 510 manually taken by the user on social media platform 508, and generates, based on the plurality of historical user actions 510, an action profile that represents user tendencies for executing available actions on social media platform 508.

Social media platform 508 may offer a countless number of social media items (e.g., posts, pages, stories, feeds, etc.). Avatar 516 is configured to identify topics relevant to the user and perform user actions on behalf of the user. However, this does not suggest that avatar 516 is directed to sift through all social media items on social media platform 508 and perform a corresponding user action (e.g., "like" all posts with cars because the user has an interest in vehicles). The action profile provides structure to avatar 516 such that the user tendencies are reflected in the tendencies of avatar 516. For example, social media platform 508 may have a recommendation engine that offers social media items to the user when he/she accesses a social media application. The user may scroll through 20 social media items, comment on one item, like three items, and share two items with other connections. If this behavior is the typical usage of the social media application by the user (as captured in the action profile), avatar 516 is also trained to retrieve 18-22 social media items, comment on 1-2 items, like 2-4 items, and share 1-3 items (here the outer bounds are also set by user historical information such that an avatar 516 will like at most 4 posts if the most likes the user has ever given in a user session is 4 likes). In some aspects, social media parser

512 groups different user sessions using timestamps such that a first user session (e.g., with 40 user actions) can represent the actions avatar 516 will take in one avatar session and a second user session (e.g., with 50 user actions) can represent the actions avatar 516 will take in a different avatar session.

In some aspects, social media parser 512 generates the action profile by first identifying a plurality of available user actions on social media platform 508. For example, if social media platform 508 is an image sharing application, example user actions may be posting an image, liking an image, sharing the image, commenting on the image, saving an image, etc. Other example user actions may include visiting a page of a different user or group, clicking on an advertisement, posting a temporary image/video, viewing a temporary image/video, etc. In general, an available user action is posting media, commenting on a post, liking a post, disliking a post, following another user, unfollowing the another user, making a transaction, or subscribing to a channel.

Social media parser 512 may then identify a plurality of content types on which the plurality of available user actions can be executed. Each social media item on social media platform 508 has an associated content type. A content type may be a general category such as "image," "video," "page," etc. A content type may also be more specific, such as "image of a car," "image of a follower," "image of a landscape," "selfie image," "video of a bird," "post about politics," "advertisement for a restaurant chain," etc. A content type may be found in the metadata of a social media item and may be provided by social media platform 508.

For each respective user action of the plurality of available user actions and each respective content type of the plurality of content types, social media parser 512 may determine a likelihood of the respective content type appearing on the social media platform and an amount of times the user executed the respective user action on the respective content type. In some aspects, the likelihood of the respective content type depends on how specific the content type is. If social media platform 508 solely categorizes social media items as images, videos, texts, etc., then the likelihood is based on how many instances of each content type appears in the total social media items (e.g., 80% of all social media items on social media platform 508 are images, 20% are videos, 10% are audio, etc.). The likelihood therefore depends on the social media platform. For example, an image sharing social media platform will more likely feature images, whereas a three-dimensional metaverse platform may feature specific virtual reality or augmented reality effects.

If social media platform 508 categorizes social media items with more specificity (e.g., selfie image, audio of political speech, etc.), the likelihood depends on the recommendation engine of social media platform 508. As discussed before social media platform 508 may have a recommendation engine that pushes content towards the user based on how relevant the content is to a user profile. If a user views comedic videos on social media platform 508, the recommendation engine will push more comedic videos to the feed of the user. Social media parser 512 may therefore analyze the content types that are frequently shown to the user and determine a likelihood of a content type appearing in a given feed relative to a total amount of social media items that appear on the feed (e.g., 15% videos of cars, 5% selfies, 60% photos of friends, etc.).

Social media parser 512 subsequently evaluates an amount of times the user executed a respective user action on a respective content type (e.g., how many times did the user like a video of a car, how many times did the user comment on a video of a car, how many times did the user share a video of a car, etc.). Social media parser 512 stores the likelihood and the amount of times in the action profile. In some aspects, a product of a likelihood and an amount of times represents a probability of a user taking a specific action on a social media item of a specific content type.

In an exemplary aspect, backup parser 506 then retrieves a backup of at least one computing device associated with the user. The backup comprises information from at least one data source that is not social media platform 508. For example, backup parser 506 may retrieve backup 504, which includes information from data sources 502a, 502b, 502c, and 502d. Backup parser 506 identifies a plurality of data items (e.g., files) in backup 504 and classifies the plurality of data items into a plurality of topics. Backup parser 506 may store the plurality of topics in a topic profile.

In some aspects, backup parser 506 may comprise a plurality of machine learning algorithms that classify different types of files into topics. For example, a first algorithm may be text-based that receives a document and identifies the words (aside from stop words) that appear most often in the document. The word(s) that appear(s) most often may be identified as the topic(s). For example, a document may discuss global warming and may use words such as "climate change" several times. Backup parser 506 may identify "climate change" as a topic. A second algorithm may analyze images and identify, using object recognition, a plurality of objects. The objects that appear most often in backup 504 may be identified by backup parser 506 as topics. For example, a user may take several photos of his cat. Because the cat appears in multiple images as an object (e.g., the objects may be ranked based on appearance in images), backup parser 506 may identify "cat" as a topic. A third algorithm may analyze videos and similarly detect objects that are later categorized as topics. A fourth algorithm may analyze video games. A fifth algorithm may analyze applications. These are a few examples of algorithms that backup parser 506 may execute to determine topics relevant to the user.

In some aspects, backup parser 506 may rank the plurality of topics in the topic profile based on a frequency of appearance in backup 504. For example, certain topics may reappear across multiple data items/files. If the topics reappear, they may be more relevant to the user (i.e., more interesting to the user). Accordingly, backup parser 506 may tally an amount of times a topic is identified and sort the plurality of topics such that topics that appear more often are listed higher than topics that appear less often.

Training module 514 receives the topic profile and the action profile from backup parser 506 and social media parser 512, respectively, and trains avatar 516 to detect, in social media platform 508, a social media item that shares at least one topic of the plurality of topics from backup 504 and perform a user action in accordance with the action profile.

In some aspects, avatar 514 is a collection of machine learning algorithms. A first machine learning algorithm is configured to classify a social media item on social media platform 508 and determine whether the topic associated with the social media item matches a topic in the topic profile. A second machine learning algorithm is configured to determine based on the likelihoods and amount of times in the action profile whether a user would perform an action on the social media item, and if yes, select an action from the plurality of available user actions. In some aspects, training avatar 516 further comprises weighting high-ranked topics higher than low-ranked topics in the topic profile such that avatar 516 has a greater likelihood of performing an available user action on social media platform 508 for the high-ranked topics than the low-ranked topics. A weight may be input into an input matrix used to train avatar 516.

A third machine learning algorithm is configured to perform the user action in a manner that the actual user would perform the action. For example, if the action requires uploading a photo to social media platform 508, the third machine learning algorithm may be configured to identify a local photo that the actual user would upload and select a time to upload the photo based on how the user uploaded photos historically. In some aspects, each of these three machine learning algorithms may be split into another plurality of machine learning algorithms (e.g., classifiers, speech recognition algorithms, object detection, regression, etc.). For example, there may be a machine learning algorithm for each complex user action. Subsequent to training avatar 516, avatar generation module 501 may execute the trained avatar 516 to perform actions on behalf of the user on social media platform 508.

There are various scenarios in which avatar 516 may use information from the topic profile learned from data sources 502 and the action profile learned from user actions 510, and apply them to new content on social media platform 508. For example, data source 502a may be a text or email database (i.e., data items include texts and emails) that suggests that the user frequently speaks to another user (e.g., the another user may be a topic that is ranked higher than other topics). If the user and the another user both have a presence on social media platform 508, avatar 516 may comment on a post made by the another user on social media platform 508. In some aspects, avatar 516 may phrase the comments in a manner that resembles the language the user uses to communicate with the another user via email/text message. For example, the user and the another user may communicate in a particular language (e.g., French) and avatar 516 may post a comment in French. In another example, the user and the another user may have spelling and grammar errors in their emails/texts and avatar 516 may mimic the writing style to include such errors. This makes the comment seem more personable.

In another scenario, a data item is a photo. Backup parser 506 may detect an object in the photo and classify the object into a topic. For example, a photo may include an electric sports vehicle, which is identified using an image classifier or an object detector. The vehicle becomes a topic (e.g., "Tesla Model S"). As more references are found to the vehicle in data sources 502, the importance of the topic is increased (e.g., the topic is ranked higher than others) by backup parser 506. For example, the vehicle may also be referenced in texts, emails, videos, etc. Accordingly, avatar 516 may receive a post, determine that the post is about the Tesla Model S and perform a user action that the actual user is likely to perform when seeing such a post. For example, the user action may be sharing the post on the user's feed on social media platform 508.

In another scenario, a data item is a transaction confirmation document (e.g., a sales receipt in a confirmation email). Backup parser 506 may identify an asset that is part of the transaction confirmation document. For example, the confirmation email may indicate that the user bought a laptop (i.e., the asset). In this case, the model of the laptop (e.g., Macbook Pro) or the manufacturing company (e.g., Apple) may be the topic identified by backup parser 506. Accordingly, avatar 516 may receive a post on social media platform 508, detect that a topic of the post is "Macbook Pro" and perform a user action based on the action profile.

It should noted that backup 504 is taken at a first time in a series of backups, and that there may be subsequent backups that are more recent. Because backup 504 is utilized as a central resource for evaluating the interests of a user, changes in interests may be visible across multiple backups. For example, at a first time, a backup may reflect a user searching for a new house to buy (e.g., it may include searches on real estate websites and house offer documents). At a second time a few weeks later, a backup may reflect a house purchase and mortgage applications. At a third time a few weeks later, a backup may reflect a closing document and house repair invoices. Accordingly, the behavior of avatar 516 may change over time. For example, avatar 516 may, at the first time, enter comments on posts showing houses for sale. At the second time, avatar 516 may like posts with mortgage offers from different banks. At the third time, avatar 516 may share, with a relative who lives with the user and uses social media platform 508, videos with do-it-yourself (DIY) house repair content.

On a more technical level, this change in behavior is achieved by weighting the topics profile as discussed previously. Avatar generation module 501 may retrieve a second backup that is more recently generated than backup 504. Backup parser 506 may identify another plurality of data items in the second backup and classify the another plurality of data items into another plurality of topics. Training module 514 may then weight topics for avatar 516 such that the another plurality of topics from the second backup are weighted higher than the plurality of topics from backup 504. In particular, the second backup may be an incremental backup that only includes changes relative to backup 504. This reduces an overlap of topics between the two backups. Nonetheless, if an overlap does exist, training module 514 may weight the overlapping topics higher than all other topics. In general, avatar generation module 501 periodically retrieves a new backup associated with the user (e.g., every week or whenever a new backup is available), re-trains the trained avatar 516 based on the new contents.

FIG. 6 illustrates a flow diagram of method 600 for generating a user behavioral avatar that handles social media user actions. At 602, avatar generation module 501 receives a request to generate avatar 516 that performs actions on behalf of user 101 on social media platform 508. At 604, avatar generation module 501 identifies a plurality of historical user actions 510 manually taken by user 101 on social media platform 508. At 606, avatar generation module 501 generates, based on the plurality of historical user actions 510, an action profile that represents user tendencies for executing available actions on social media platform 508. At 608, avatar generation module 501 retrieves backup 504 of at least one computing device (e.g., smartphone 1 of FIG. 1) associated with user 101, wherein backup 504 comprises information from at least one data source (e.g., data source 502a) that is not social media platform 508. At 610, avatar generation module 501 identifies a plurality of data items in backup 504.

At 612, avatar generation module 501 classifies the plurality of data items into a plurality of topics. At 614, avatar generation module 501 trains avatar 516 to detect, in social media platform 508, a social media item that shares at least one topic of the plurality of topics from backup 504 and perform a user action in accordance with the action profile. At 614, avatar generation module 501 executes the trained avatar 516 to perform actions on behalf of user 101 on social media platform 508.

Figure 7:
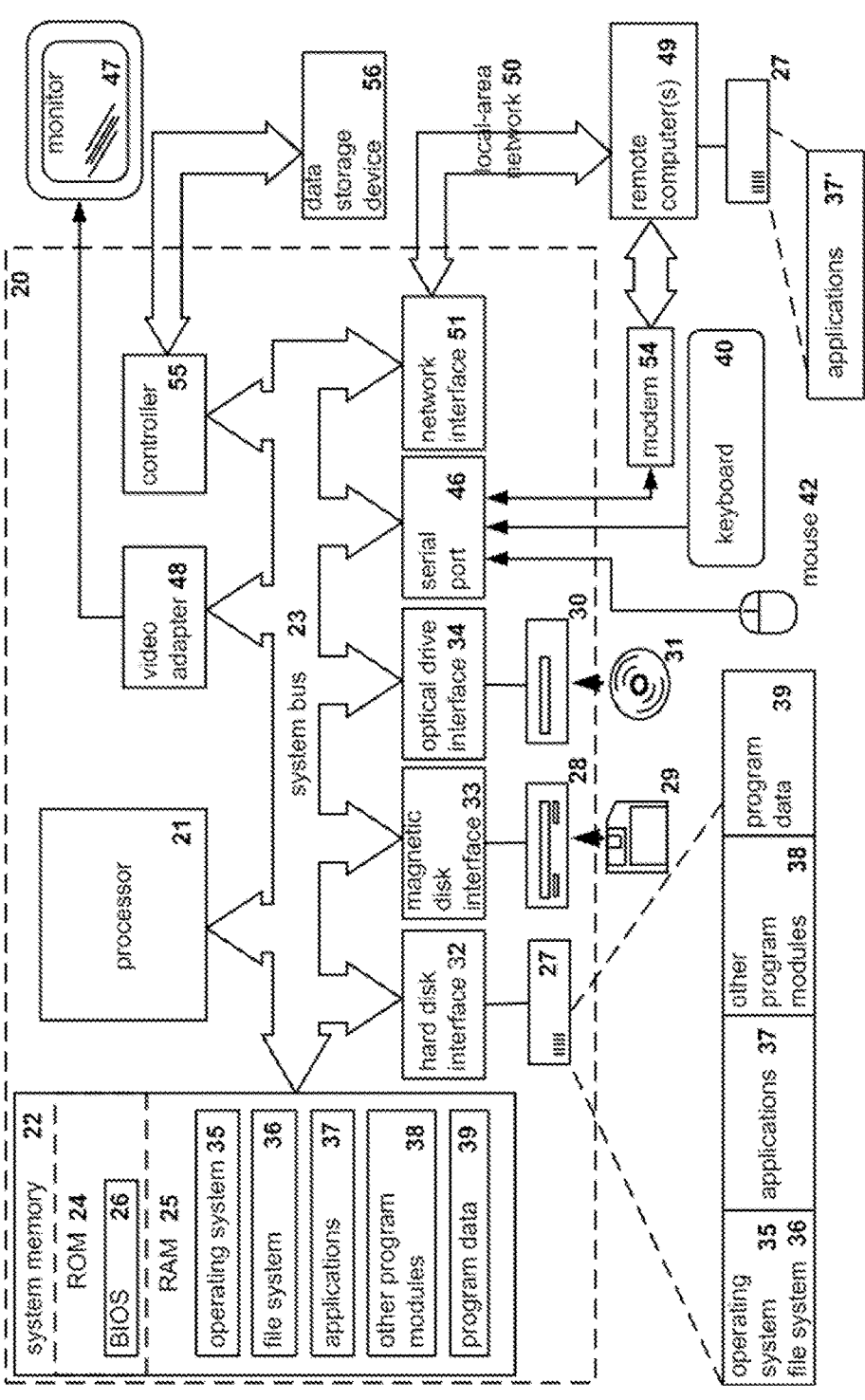
FIG. 7 illustrates an example of a general-purpose computer system on which the disclosed systems and method can be implemented.

FIG. 7 illustrates an example of a general-purpose computer system (which may be a personal computer or a server) on which the disclosed systems and method can be implemented according to an example aspect. It should be appreciated that the detailed general-purpose computer system can correspond to the computer 110 and/or one or more computers of cloud computing service 250 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 212 and the system memory 22 can correspond to memory 218 of FIG. 2, according to an exemplary aspect.

Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for generating a user behavioral avatar for a user based on backup of personalized user data, the method comprising:

receiving a request to generate an avatar that performs actions on behalf of a user on a social media platform;

identifying a plurality of historical user actions manually taken by the user on the social media platform;

generating, based on the plurality of historical user actions, an action profile that represents user tendencies for executing available actions on the social media platform;

retrieving a backup of at least one computing device associated with the user, wherein the backup comprises information from at least one data source that is not the social media platform;

identifying a plurality of data items in the backup;

classifying the plurality of data items into a plurality of topics, wherein classifying the plurality of data items into the plurality of topics further comprises ranking the plurality of topics based on a frequency of appearance in the backup;

training the avatar to detect, in the social media platform, a social media item that shares at least one topic of the plurality of topics from the backup and perform a user action in accordance with the action profile, wherein training the avatar further comprises weighting high-ranked topics higher than low-ranked topics such that the avatar has a greater likelihood of performing an available user action on the social media platform for the high-ranked topics than the low-ranked topics, and wherein weights of the trained avatar are updated in response to each new backup generated of the at least one computing device; and executing the trained avatar to perform actions on behalf of the user on the social media platform.

2. The method of claim 1, wherein the social media platform is a metaverse-based application, and wherein the trained avatar performs actions on behalf of the user when the user is not manually accessing the metaverse-based application.

3. The method of claim 1, wherein generating the action profile comprises:

identifying a plurality of available user actions on the social media platform;

identifying a plurality of content types on which the plurality of available user actions can be executed;

for each respective user action of the plurality of available user actions and each respective content type of the plurality of content types:

determining a likelihood of the respective content type appearing on the social media platform;

determining an amount of times the user executed the respective user action on the respective content type; and storing the likelihood and the amount of times in the action profile.

4. The method of claim 1, wherein the backup is a first backup, further comprising:

retrieving a second backup that is more recently generated than the first backup;

identifying another plurality of data items in the second backup;

classifying the another plurality of data items into another plurality of topics;

weighting topics for the avatar such that the another plurality of topics are weighted higher than the plurality of topics.

5. The method of claim 1, wherein the at least one data source is an email database, an application database, a documents database, or a media database.

6. The method of claim 1, wherein a data item is a photo, and wherein classifying the data item into a topic comprises:

detecting an object in the photo; and classifying the object into a first topic.

7. The method of claim 1, wherein a data item is a transaction confirmation document, and wherein classifying the data item into a topic comprises:

identifying an asset that is part of the transaction confirmation document; and classifying the asset into a first topic.

8. The method of claim 1, wherein an available user action is posting media, commenting on a post, liking a post, disliking a post, following another user, unfollowing the another user, making a transaction, or subscribing to a channel.

9. The method of claim 1, further comprising periodically retrieving a new backup associated with the user, and wherein the trained avatar is re-trained when the new backup is retrieved for analysis.

10. A system for generating a user behavioral avatar for a user based on backup of personalized user data, the system comprising:

a hardware processor configured to:

receive a request to generate an avatar that performs actions on behalf of a user on a social media platform;

identify a plurality of historical user actions manually taken by the user on the social media platform;

generate, based on the plurality of historical user actions, an action profile that represents user tendencies for executing available actions on the social media platform;

retrieve a backup of at least one computing device associated with the user, wherein the backup comprises information from at least one data source that is not the social media platform;

identify a plurality of data items in the backup;

classify the plurality of data items into a plurality of topics, wherein classifying the plurality of data items into the plurality of topics further comprises ranking the plurality of topics based on a frequency of appearance in the backup;

train the avatar to detect, in the social media platform, a social media item that shares at least one topic of the plurality of topics from the backup and perform a user action in accordance with the action profile, wherein training the avatar further comprises weighting high-ranked topics higher than low-ranked topics such that the avatar has a greater likelihood of performing an available user action on the social media platform for the high-ranked topics than the low-ranked topics, and wherein weights of the trained avatar are updated in response to each new backup generated of the at least one computing device; and execute the trained avatar to perform actions on behalf of the user on the social media platform.

11. The system of claim 10, wherein the social media platform is a metaverse-based application, and wherein the trained avatar performs actions on behalf of the user when the user is not manually accessing the metaverse-based application.

12. The system of claim 10, wherein the hardware processor is configured to generate the action profile by:

identifying a plurality of available user actions on the social media platform;

identifying a plurality of content types on which the plurality of available user actions can be executed;

for each respective user action of the plurality of available user actions and each respective content type of the plurality of content types:

determining a likelihood of the respective content type appearing on the social media platform;

determining an amount of times the user executed the respective user action on the respective content type; and storing the likelihood and the amount of times in the action profile.

13. The system of claim 10, wherein the backup is a first backup, wherein the hardware processor is configured to:

retrieve a second backup that is more recently generated than the first backup;

identify another plurality of data items in the second backup;

classify the another plurality of data items into another plurality of topics;

weight topics for the avatar such that the another plurality of topics are weighted higher than the plurality of topics.

14. The system of claim 10, wherein the at least one data source is an email database, an application database, a documents database, or a media database.

15. The system of claim 10, wherein a data item is a photo, and wherein the hardware processor is configured to classify the data item into a topic by:

detecting an object in the photo; and classifying the object into a first topic.

16. The system of claim 10, wherein a data item is a transaction confirmation document, and wherein the hardware processor is configured to classify the data item into a topic by:

identifying an asset that is part of the transaction confirmation document; and classifying the asset into a first topic.

17. The system of claim 10, wherein an available user action is posting media, commenting on a post, liking a post, disliking a post, following another user, unfollowing the another user, making a transaction, or subscribing to a channel.

18. A non-transitory computer readable medium storing computer executable instructions for generating a user behavioral avatar for a user based on backup of personalized user data, including instructions for:

receiving a request to generate an avatar that performs actions on behalf of a user on a social media platform;

identifying a plurality of historical user actions manually taken by the user on the social media platform;

generating, based on the plurality of historical user actions, an action profile that represents user tendencies for executing available actions on the social media platform;

retrieving a backup of at least one computing device associated with the user, wherein the backup comprises information from at least one data source that is not the social media platform;

identifying a plurality of data items in the backup;

classifying the plurality of data items into a plurality of topics, wherein classifying the plurality of data items into the plurality of topics further comprises ranking the plurality of topics based on a frequency of appearance in the backup;

training the avatar to detect, in the social media platform, a social media item that shares at least one topic of the plurality of topics from the backup and perform a user action in accordance with the action profile, wherein training the avatar further comprises weighting high-ranked topics higher than low-ranked topics such that the avatar has a greater likelihood of performing an available user action on the social media platform for the high-ranked topics than the low-ranked topics, and wherein weights of the trained avatar are updated in response to each new backup generated of the at least one computing device; and executing the trained avatar to perform actions on behalf of the user on the social media platform.

* * * * *